Oct. 23, 1956

A. W. FOWLER 2,767,935

COMBINATION SPINNING AND CASTING REEL

Filed Aug. 18, 1953

ALVAH W. FOWLER
INVENTOR.

BY

ATTORNEY

United States Patent Office 2,767,935
Patented Oct. 23, 1956

2,767,935

COMBINATION SPINNING AND CASTING REEL

Alvah W. Fowler, Fort Worth, Tex.

Application August 18, 1953, Serial No. 375,033

4 Claims. (Cl. 242—84.5)

This invention relates to fishing reels for casting and fly fishing, and it has particular reference to a type of reel which, by reason of its novel design, can be used as a combination free spinning casting reel and a fly reel, and the principal object of the invention resides in the provision of a reeling device in which the line spool is normally stationary and has its axis in a vertical plane, and wherein is provided a unique device which automatically functions to engage the line and wind the same upon the reel in retrieving operations.

An object of the invention is that of providing a reel which is uncommonly simple in design and structure, and in the use of which there is no possibility of back-lashing, affording a mechanism by which casts can be made by both skilled and unskilled persons without thumbing the reel, as in the use of conventional equipment.

Another object of the invention is the provision of a fishing reel in which the line, as well as all of the working parts, are enclosed and thus protected against dirt and grit, and in which all of the desirable features of the conventional reel is embodied but to which are added many novel features of smooth and efficient operation as well as a pleasing and attractive appearance.

Included among the many objects of the invention is the provision of the several control features, such as the retarding device or "clicker" element by which tension can be applied to the line at will to prevent the same from being run out while the invention is being carried, or while the same is not in use, yet enabling the line to be drawn out if desirable.

Broadly, the invention contemplates the provision of a fishing reel in which none of the working parts are operated while the line is run out, except when tension is desired, providing a completely free spinning mechanism by which the line can be protected at all times against backlashing, and affording a device which is economical in both structure and maintenance.

While the foregoing objects are paramount, other and lesser objects will become manifest as the description proceeds, taken in connection with the appended drawings wherein.

Figures 1, 2, 3, 4, 5, 6, 7:
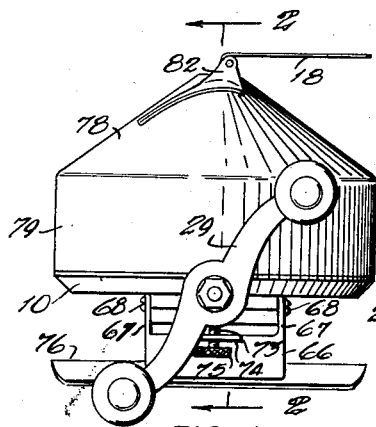
Figure 1 is a right-side elevational view of the invention illustrating the crank, the mounting member and the line roller guide at the top of the conical cover.
Figure 2 is a vertical sectional view of the invention, on lines 2—2 of Figure 1, illustrating the stationary spool, the winding and guide mandrel for the line, and the detents for engaging the line.
Figure 3 is a plan view of the winding and guide mandrel showing the arrangement of the tangentially disposed detents.
Figure 4 is a perspective illustration of the winding and guide mandrel, which has a circumferential flange, and showing the actuator spring for the detents.
Figure 5 is a plan view of the actuator spring for the line detents, the winding and guide mandrel being fragmentarily shown and the central shaft being shown in transverse section.
Figure 6 is a front view of the invention showing the base and the winding and guide mandrel in partial section, and illustrating the spool tensioning device.
Figure 7 is a perspective illustration of the retarding mechanism for the winding guide mandrel.

Accordingly, the invention comprises a base member 10 which is preferably circular in form and has an internally bevelled flange 11 formed thereon, as apparent in Figures 2 and 6. A cylindrical chamber 12 is defined concentrically of the base 10 by an external embossment 13 on the underside of the base 10 and a circular body 14 concentrically of the upper face thereof, as shown in Figure 2. The member 14 has an extended cylindrical neck portion 15 which is externally threaded at its upper end.

The base 10, therefore, has an annular depression 16 in its upper face about the body 14, the internally bevelled flange 11 defining its outer circumference. Seated in the annular depression 16 is a spool 17 which embraces the body 14 and is capable of frictionally tensioned rotation thereon, but is normally stationary while the fishing line 18 thereon is played out, an operation which will presently be described. The spool 17 is secured in position by a circular plate 19 bearing against its upper flange and secured by screws 20 to the body 14.

Rotatably mounted on the neck portion 15 of the body 14 is a line guide and winding mandrel 21 which is spaced from the upper surface of the spool 17 by a relatively thin fiber ring 22 which also provides a bearing for the undersurface of the mandrel 21. A circular nut 23 is threaded upon the neck portion 15 and against the top surface of the mandrel 21 to retain the same for free rotation on the element 15.

The mandrel 21 is circular and has a peripheral flange 24 formed thereon and whose upper outer edge 25 is chamfered or rounded to present a smooth surface over which the line 18 can move as it is reeled from the spool 17, as illustrated in Figures 2 and 6. It is desirable to form the body of the mandrel 21 so as to define annular bevelled top and bottom surfaces which incline downwardly and outwardly toward the annular flange 24, the lowermost edge at the base of the flange 24 being rounded also to present a smooth working surface for the line 18.

Journalled through a portion 26 of the base 10, in which is arranged a sleeve 27, is a horizontal shaft 28 which has a double armed crank 29 on its outer end. A bevelled gear 30 is secured to the inner end of the shaft 28 within the chamber 12 and which is meshed with a smaller bevelled gear 31 on the lower end of a tubular vertical shaft 32 which is journalled concentrically of the neck portion 15 of the body 14 and projects thereabove. A driving connection is provided between the vertical shaft 32 and the mandrel 21 and will be presently described.

Rigidly secured to the upper end of the shaft 32 by a set screw 33 is a truncated conical hub member 34 which has a pin 35 depending from its undersurface on one side, as shown in Figures 2, 4 and 5, which extends into an arcuate slot 36 formed in the mandrel 21. A spring 37 is arranged about the circular nut 23 and has one end secured to a pin 38 in the top surface of the mandrel 21 while its opposite end is hooked about the pin 35 depending from the hub member 34. The spring 37 is formed substantially circular and normally exerts a rotative tension on the hub member 34, and thus the shaft 32, to permit a relatively slight rotation of the latter before the mandrel 21 is moved when the crank 29 is operated to rotate the shafts 28 and 32.

Pivotally secured, at their inner ends, to the hub member 34 are a plurality of detent arms 39 which extend tangentially from the axis of the hub member 34, as shown in Figures 2, 3 and 4, and whose outer ends 40 project into apertures 41 spaced about and through the flange 24 of the mandrel 21. The outer ends 40 of the detents 39 are preferably round and capable of free movement through the apertures 41 when extended and retracted, as in Figures 2, 4 and 6, and in dotted lines in Figure 3, in which latter illustration the detents 39 are shown in solid lines in their normal retracted position under the tension of the spring 37. The inner ends of the detents 39 are pivotally secured to the hub member 34 by screws 42, or other suitable device.

By the arrangement just described the mandrel 21 is freely rotatable by the crank 29 in either direction moving anti-clockwise to wind the line 18 upon the spool 17. Normally, while the mandrel 21 is at rest, the detent arms 39 are retracted by the spring 37 which exerts only enough tension on the hub member 34 to retain the pin 35 against the rearmost end of the slot 36 in the mandrel 21 in which it operates, thus retaining the detent arms 39 fully retracted to clear the outer peripheral surface of the mandrel 21 so as not to present any deterrent to the sliding movement of the line 18 thereover while being played out from the spool 17.

When the crank 29 is operated, however, in a forward motion to turn the mandrel 21 anticlockwise, the pin 35 in the hub member 34 will move to the opposite end of the slot 36 and this slight rotative movement of the hub member 34 will extend the ends 40 of the detent arms 39 beyond the periphery of the mandrel 21, in the manner indicated in dotted lines in Figure 3, and any one of these members will engage the line 18, as illustrated in Figure 6, to wind the same upon the spool 17. When the crank 29 is released the detent arms 39 are immediately retracted and the line 18 is free to spin off of the spool 17.

A retarding device for the mandrel 21 is provided by which the detent arms 39 can also be locked in their extended positions, thus preventing the line 18 from being unwound from the spool 17. A plunger 43 having its upper end bent to provide a right-angular portion 44, is slidably arranged through the tubular vertical shaft 32. The outer end of the right-angular portion 44 of the plunger 43 is bent downwardly providing a locking pin 45. Near the lower end of the plunger 43 is a small spur gear 46 secured thereon by a pin or screw 47, as shown in Figures 2 and 7, and the lowermost end of the plunger 43 is seated in a bearing boss 48 in the bottom of the chamber 12. A compression spring 49 is arranged upon the plunger 43 below the lowermost end of the vertical shaft 32, and the gear 31 thereon, and bears between the latter and the spur gear 46 to normally retain the plunger 43 in its lowermost position.

The upper end of the tubular vertical shaft 32 has a transverse slot 50 therein to receive the right-angular portion 44 of the plunger 43 while the latter is held down under the tension of the spring 49 thus causing the plunger 43 to be rotated with the shaft 32, the depending locking pin 45, formed with the right-angular portion 44, reposing in a conforming notch 51 in the perimeter of the hub member 34, as shown in Figures 3 and 4. The plunger 43 is operated through the medium of a detent plunger 52 arranged horizontally through a boss 53 on the bottom of the base 10, opposite the horizontal shaft 28, on which is formed an operating head 54.

Providing an operative connection between the inner end of the detent plunger 52 and the plunger 43 is a spring 55 which is formed U-shaped and coiled about a pin 56 transversely of and intermediate the ends of its legs 57 at which point the latter are bent at right-angles so that the outer ends of the legs 57 extend beneath the spur gear 46 while the loop end 58 of the spring 55 extends upwardly, forming a type of flexible bell-crank pivoted on the pin 56 which is supported at its ends in the walls of the chamber 12.

The loop end 58 of the spring 55 is seated in a notch 59 in the under side of the detent plunger 52 near its inner end so that, when the latter is moved outwardly, the plunger 43 is raised against the tension of the spring 49 but not enough to move the right-angular portion of the plunger 43 out of the slot 50 in the upper end of the shaft 32. This operation will enable the mandrel 21 to be freely rotated, when desired, by the crank 29 without any drag or tension thereon, but when the detent plunger 52 is moved inwardly the tension of the spring 49 will depress the plunger 43 in order that the depending locking pin 45 thereon will enter a socket 60 in the upper face of the mandrel 21 when slight pressure is applied to the crank 29. The socket 60 is shown in Figure 3 spaced from the notch 51 in the hub member 34 in the direction of rotation thereof.

The inner portion of the detent plunger 52 has a recess 61 formed on its upper side and a flat spring 62 is arranged thereon along the longitudinal axis of the detent plunger 52 and extending beyond its inner end so as to engage the teeth of the spur gear 46. When the locking pin 45 is engaged with the socket 60, therefore, a tension or drag is exerted on the mandrel 21 and the hub member 34 is locked thereto in a position to extend the detent arms 39 so that the line 18 cannot be reeled from the spool 17 without the rotation of the mandrel 21. The detent plunger 52 is frictionally secured in its operative and inoperative positions by a spring 63 which is secured in the base 10 and extends outwardly beneath the boss 53 and into a notch 64 formed therein to engage one of two spaced depressions 65 formed in the undersurface of the detent plunger 52, in the manner illustrated in Figures 2 and 7.

The spool 17 is normally stationary but is capable of rotation under a substantial tension to lend yieldability to the line 18 when an excessive pull is exerted thereon, as when retrieving a relatively large catch or when the line becomes snagged in submerged vegetation, and the like. The normal tension on the spool 17 can be determined and set when the invention is assembled and additional tension can be applied thereto, as desired, through the medium of a lever device which comprises a bar 66 having right-angular arms 67 formed with each end and which are inclined upwardly and pivoted to the base 10 at each side of the portion 26 thereof by screws 68, as shown in Figures 1 and 6.

The tips 69 of the arms 67 bear against the outer ends of plastic plugs 70 arranged in apertures 71 in the base 10, each having a head 72 thereon which engages the undersurface of the spool 17, as shown in Figure 6, whereby pressure can be exerted thereon when the bar 66 is pressed inwardly by the fingers of the operator. Such tension can be fixed, when desired, by a set screw 73 threaded through a tab 74 formed with the bar 66 and extending outwardly at right angles therefrom parallel to the bottom of the base 10. The screw 73 has a knurled head 75 thereon whereby to thread the same against the bottom of the base 10, as shown in Figures 1, 2 and 6.

The invention is adapted to be detachably secured to a fishing rod (not shown) by a saddle member 76 secured to the bottom of the embossment 13 on the base 10, and which is arcuate in transverse section conformable to a conventional rod.

The outer periphery of the flange 11 of the base 10 is recessed to define an annular shoulder 77 which provides a seat for the lower rim of a conical cover 78 which can be pressed on and locked in position by any suitable device, such as through the medium of pins and slots arranged about the base 10 and the skirt 79 of the cover 78. In the apex of the cover 78 is an outlet opening 80 for the line 18 which operates over a small roller 81 pivoted between a pair of brackets 82 attached to the cover 78 on each side of the opening 80. In casting operations the operator can apply his thumb to the line 18 over the roller 81 to tension the line as desired.

Manifestly, the invention is capable of certain changes and modifications from time to time, by persons skilled in the art, without departing from the spirit and intent of the invention or the scope of the appended claims.

What is claimed is:

1. In a fishing reel, a circular base having a rod attaching member thereon for detachable securement to a fishing rod, a spool frictionally mounted concentrically of said base and having its axis in a plane transverse to that of said rod attaching member, a tubular spindle formed with said base concentrically of said spool, a rotatable line winding and guide mandrel mounted on said spindle, a shaft in said spindle having a gear on its inner end in said base, a driving shaft in said base having a crank on its outer end and a gear on its inner end meshed with the gear of said spindle shaft, a plurality of normally retracted detents in said mandrel having their inner ends connected to said spindle shaft and having their outer ends extensible through the flange of said mandrel to engage said line when said mandrel is rotated, means in said base for retarding the rotation of said mandrel, a conical housing for said spool and mandrel having an outlet for said line in the apex thereof, and a roller for said line at said outlet providing means whereby thumb pressure can be applied to said line in casting.

2. In a fishing reel, a base having an attaching member adapting the same for mounting on a fishing rod, a normally stationary fishing line spool mounted concentrically of said base and having a fishing line wound thereon, the said spool having its axis in a plane transverse to that of said attaching member, a circular spooling mandrel having a circumferential flange thereon rotatably mounted on a spindle concentrically of and spaced from said spool, a spindle shaft and a driving shaft in said base having a geared connection and operating at right angles to each other, and a crank on said driving shaft, means providing an operative connection between said spindle shaft and said spooling mandrel for rotating the same by said crank, a plurality of normally retracted detents extensible through the said flange on said mandrel when the same is rotated to engage said line to wind the same on said spool, means in said base for retarding the rotation of said mandrel, a conical cover for said spool and said mandrel having an outlet in its apex for said line, and a thumbing roller for said line at said outlet.

3. In a fishing reel, in combination, a base having an attaching member thereon for detachable securement to a fishing rod, a fishing line spool frictionally connected to and concentrically of said base and having its axis in a plane transverse to that of said attaching member, a fishing line wound on said spool, a peripherally flanged winding mandrel and guide for said fishing line, the said mandrel having its axis concentrically of said spool, a spindle shaft in said base for rotating said mandrel and a driving shaft having a crank thereon for driving said spindle shaft, meshed bevel gears on the inner ends of said shafts in said base operatively connecting the same, normally inoperative means on said spindle shaft engageable with said line to wind the same on said spool when said mandrel is rotated, means in said base engageable with said mandrel to retard its rotation, a conical closure for said spool and said mandrel having an outlet for said line in its apex, and a thumb roller for said line mounted near said outlet.

4. In a fishing reel, a circular base having an attaching member adapted for attachment to a fishing rod, a line spool supported concentrically of said base having a friction slip connection therewith and having its axis in a plane transverse to that of said attaching member, a circular peripherally flanged line guide and winding mandrel rotatably mounted concentrically of said spool, a spindle shaft journalled in said base for rotating said mandrel, a driving shaft in said base having a crank on its outer end and a bevel gear on its inner end, a bevel gear on the inner end of said spindle shaft meshed with said gear on said driving shaft, normally retracted means on said mandrel radially extensible therefrom engaging said line when said mandrel is rotated to wind said line on said spool, means in said base having an operative connection with said mandrel to retard its rotation, a conical closure for said spool and said mandrel having an outlet for said line in the apex, and a thumbing roller for said line near said outlet.

References Cited in the file of this patent

UNITED STATES PATENTS

| 2,492,587 | Ledingham | Dec. 27, 1949 |
| 2,521,543 | Shakespeare et al. | Sept. 5, 1950 |
| 2,566,344 | Lord | Sept. 4, 1951 |
| 2,584,020 | Humphreys | Jan. 29, 1952 |
| 2,617,611 | Meierjohan | Nov. 11, 1952 |
| 2,644,647 | Denison et al. | July 7, 1953 |
| 2,668,025 | Hull | Feb. 2, 1954 |
| 2,707,597 | Rotsler | May 3, 1955 |